United States Patent [19]

Jones

[11] Patent Number: 4,529,350
[45] Date of Patent: Jul. 16, 1985

[54] LOG SKIDDING VEHICLE'S PIVOTABLE ARCH STRUCTURE

[75] Inventor: Steve D. Jones, Peoria, Ill.

[73] Assignee: Caterpillar Tractor Co., Peoria, Ill.

[21] Appl. No.: 646,321

[22] Filed: Jan. 29, 1982

[51] Int. Cl.³ .............................................. B60P 1/54
[52] U.S. Cl. .................................................... 414/494
[58] Field of Search ............... 414/538, 542, 555, 559, 414/569, 571, 494

[56] References Cited

U.S. PATENT DOCUMENTS

| | | | |
|---|---|---|---|
| 1,987,688 | 1/1935 | Lamb | 414/538 |
| 3,424,326 | 1/1969 | Thatcher | 414/494 |
| 3,841,507 | 10/1974 | Barwise | 414/569 |
| 4,278,391 | 7/1981 | Dagenais | 414/559 |
| 4,278,392 | 7/1981 | Meisel | 414/569 |

FOREIGN PATENT DOCUMENTS 174886 12/1964 U.S.S.R. .............................. 414/559

OTHER PUBLICATIONS

FMC Corporation, Model 220CA Choker Arch High Speed Steel Track Logging Vehicle, 1/79, 1–6.
FMC Corporation, Model 220AG Arch Grapple High Speed Steel Track Logging Vehicle, 1/79, 1–6.

Primary Examiner—Robert G. Sheridan
Attorney, Agent, or Firm—Joseph W. Keen

[57] ABSTRACT

A pivotable arch structure (18) having an integral log bunk (30) is pivotable at one end (P) thereof relative to a main frame (15). The log bunk (30) includes several longitudinally arranged bunk webs (36) which are bolstered by laterally arranged support beams (38) connected thereto. A bumper (40) is arranged adjacent the end of the bunk webs (36) near the pivot axis (22). The longitudinal disposition of the bunk webs (36) promotes longitudinal log travel thereon while the bumper (40) guides logs initially engaged therewith in a direction to promote their subsequent engagement with the bunk webs (36). The longitudinally arranged bunk webs (36) also provide high operator visibility for various pivotal positions of the arch structure (18).

5 Claims, 5 Drawing Figures

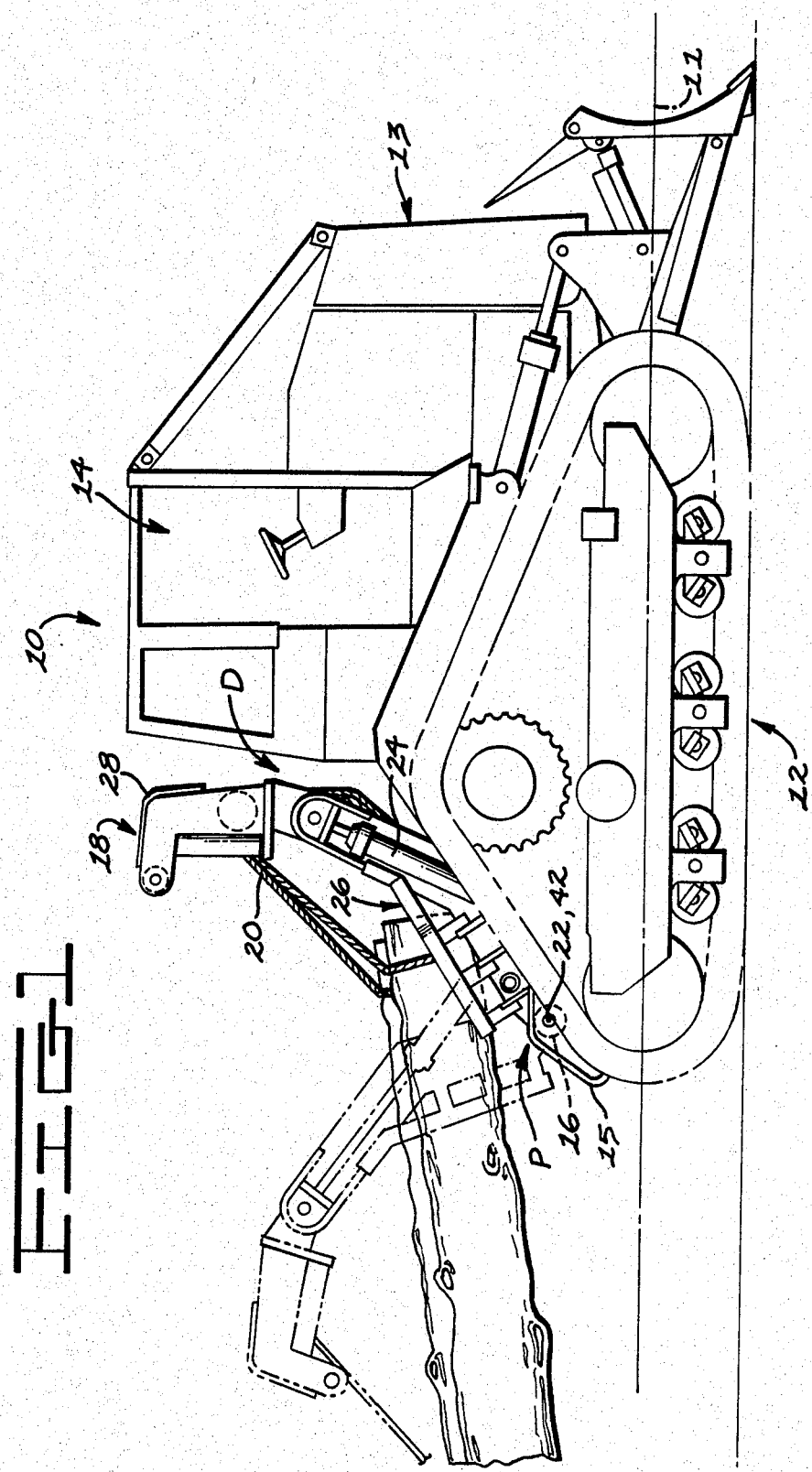

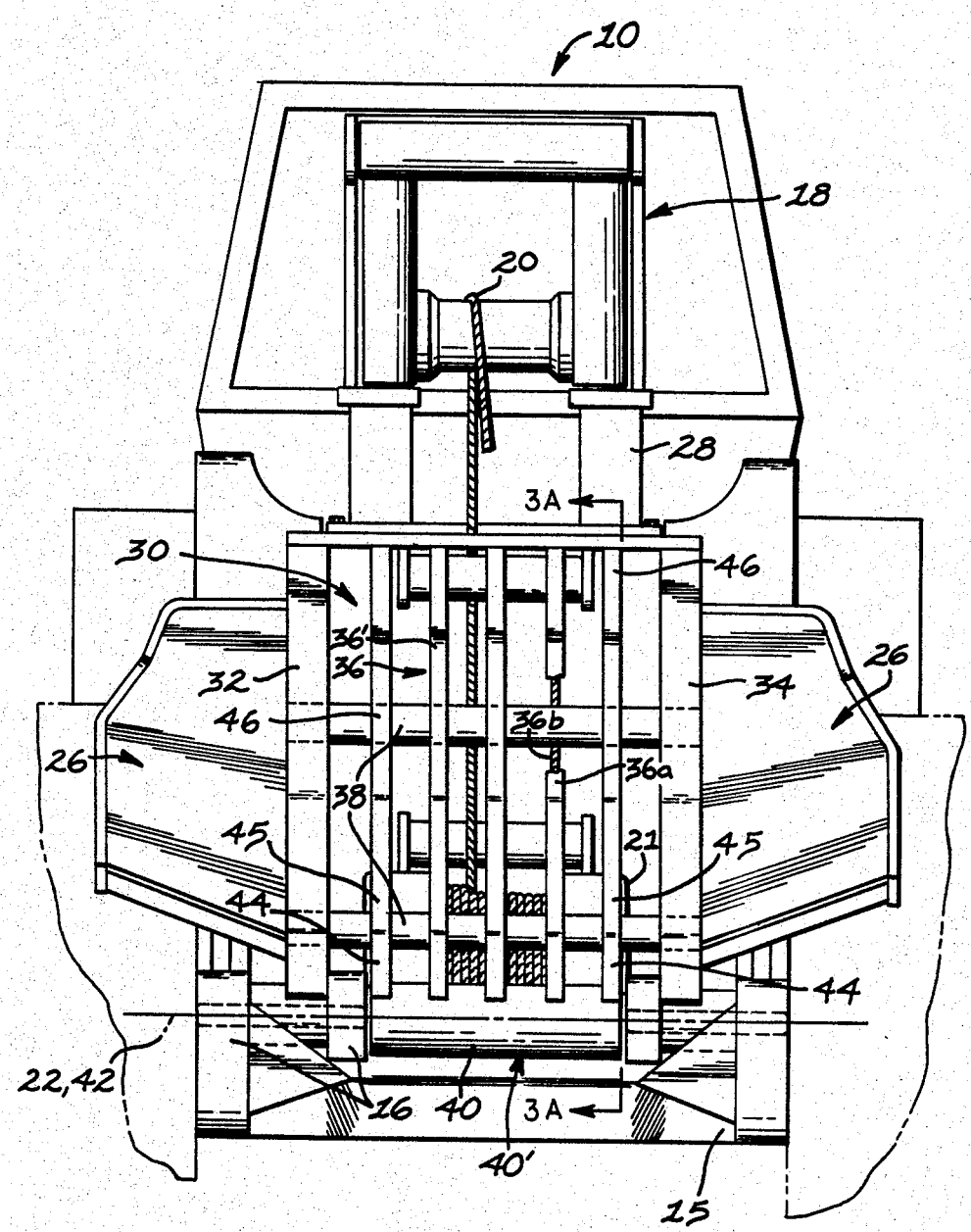

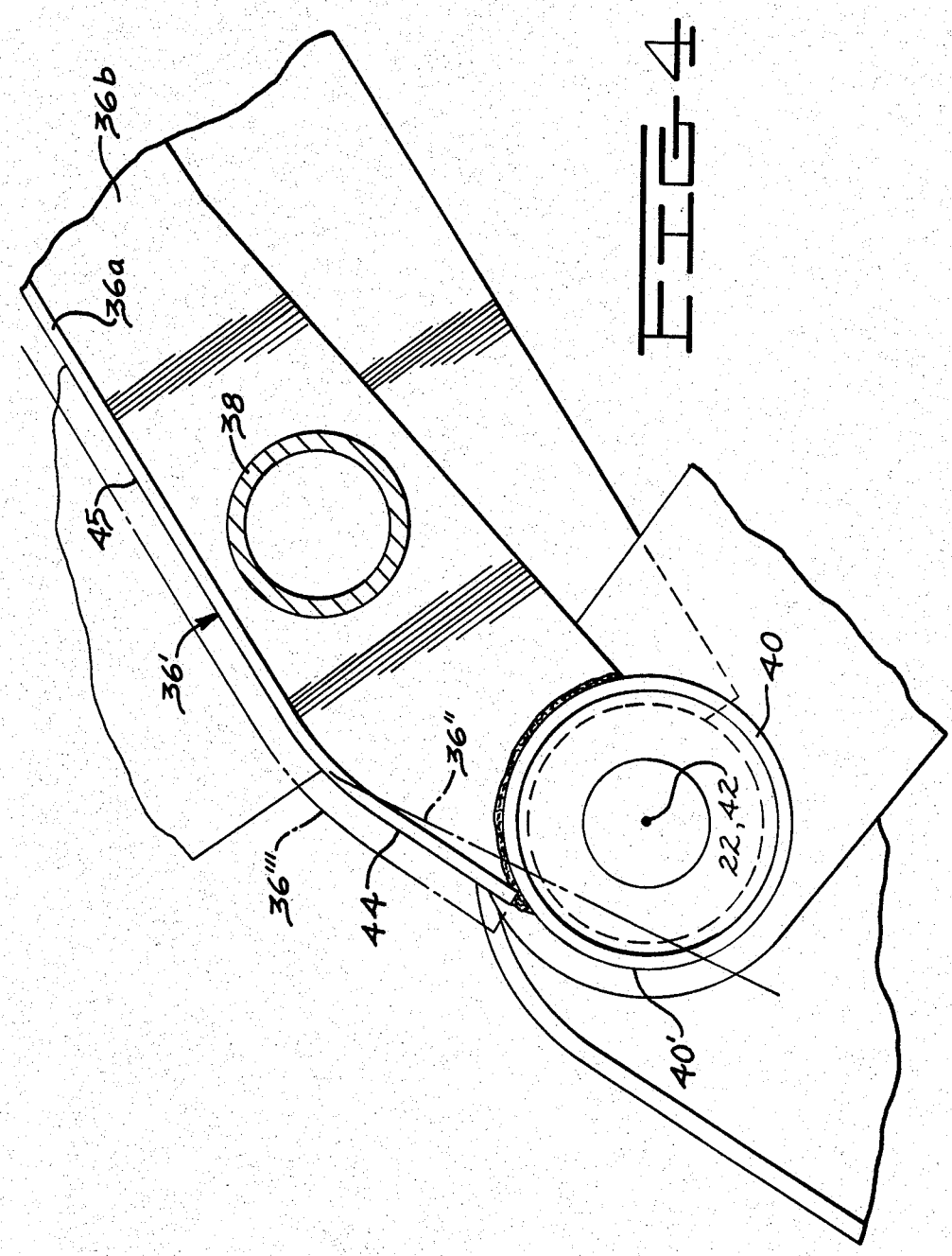

LOG SKIDDING VEHICLE'S PIVOTABLE ARCH STRUCTURE

DESCRIPTION

1. Technical Field

This invention relates to pivotal arch structures and, more particularly, to log bunks integral therewith which promote longitudinal log movement thereon.

2. Background Art

The most feasible means for transporting harvested trees from their felling point to a collection point is by dragging those trees behind a vehicle. Such log dragging is generally accomplished by either attaching logs to a log skidding vehicle with a cable or by grasping the logs with a grapple suspended from an elevated support boom carried by the vehicle chassis. When the logs are dragged behind the skidding vehicle, one end of each log being dragged is elevated and moved closer to the vehicle. The structure separating the log ends from the vehicle's chassis, cab, main frame, etc. shield the same from impact loads exerted by the adjacent log ends. Such shielding structures are known as log bunks.

Log handling apparatus (either grapple or cable manipulation devices) may be advantageously positionable relative to the skidding vehicle and log load to facilitate engagement of the logs by the log handling apparatus. To accomplish such objective the log handling apparatus is sometimes supported on a moveable structure called an arch. Functional integration of the log bunk and moveable arch permits movement of the log bunk to a variety of positions which, when coordinated with actuation of the log handling apparatus, facilitates moving the adjacent log ends to optimum skidding positions relative to the vehicle and, at the same time, protecting vulnerable vehicle components from being impacted by the log ends.

Selectively positionable arches (and integral log bunks) presently utilize support members on which the logs bear and which are oriented in a lateral fashion transverse to the vehicle's longitudinal axis. Such transverse orientation of the log bearing support members obstructs the skidder vehicle operator's view in varying degrees as the arch moves (usually pivoted) to its various positions. Obstructure of the operator's view is primarily due to the projected vertical separation distances between the lateral log bearing members narrowing as the arch pivots rearwardly and subtends a progressively smaller vertical projection. Thus, as the arch is pivoted rearwardly to accept a load of logs, the perceived vertical distance between such lateral log bearing supports becomes smaller and smaller from the operator's vantage point and thus makes proper positioning of the log skidding vehicle relative to the load of logs extremely difficult. Additionally, as the logs are moved longitudinally toward the vehicle by the log handling apparatus during skid positioning, the elevated ends of the log tend to abut the lateral log bearing members so as to hinder their further longitudinal movement onto the log bunk. This is especially true when the log handling apparatus constitutes a winch drawn cable.

The greatest obstacle for the log load to overcome during positioning adjacent the log bunk occurs when the log load initially engage the log bunk (typically the lowest, pivotal end of the arch and associated bunk). Logs presently tend to hang up on lateral log bearing members arranged at the bounding edge of the arch near the pivotal connection to the vehicle's frame. Although the greatest resistance to longitudinal movement of the log load by the log bunk occurs at the log bunk's rearmost edge, significant resistance to longitudinal log movement is encountered at each lateral log bearing support member as the log load is progressively moved longitudinally forward on the log bunk. As a result, cycle time increases because log loads are more difficult to properly position relative to the log bunk.

DISCLOSURE OF THE INVENTION

In one aspect of the present invention a log skidding vehicle is provided with a pivotable arch structure and integral log bunk which includes longitudinally arranged bunk webs and a longitudinally adjacent bumper member arranged at one end of the bunk webs. Logs initially engaging the bumper member are deflected to subsequently engage the longitudinally arranged bunk webs which promote log movement thereon and provide increased rearward visibility for the load skidding vehicle's operator.

BRIEF DESCRIPTION OF THE DRAWINGS

FIG. 1 is a side elevation view of an exemplary log skidding vehicle;

FIG. 2 is a rear elevation view of the log skidding vehicle of FIG. 1;

FIG. 4 is an enlarged elevational view of a bumper-bunk intersection portion illustrated in FIGS. 3A and 3B.

BEST MODE FOR CARRYING OUT THE INVENTION

Figure 3A:
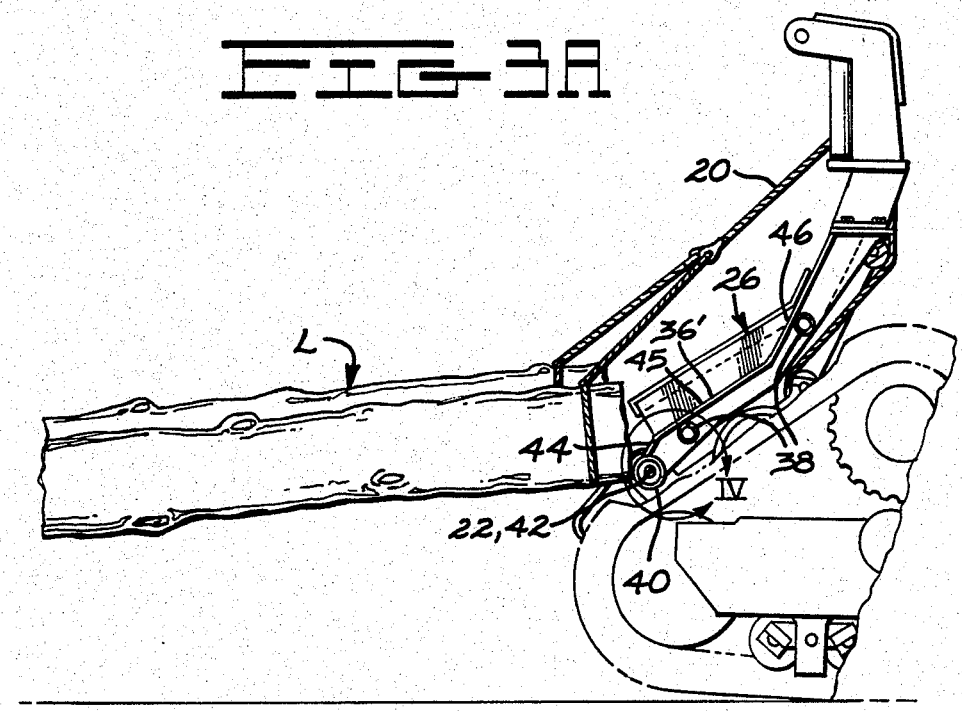
FIGS. 3A and 3B are partial sectional views of the skidding vehicle's arch structure taken along section line IIIA—IIIA of FIG. 2 showing two sequential positions of logs during movement of the log bunch L relative to the log bunk.

Referring now to the drawing in detail, FIG. 1 illustrates a track equipped, log skidding vehicle 10 having a longitudinal axis 11, an undercarriage 12, a chassis 13, and a chassis mounted operator station 14. The chassis 13 includes a main frame 15 having rearwardly extending support ears 16. An arch 18 is pivotally mounted at its proximal end P to the support ears 16 for pivotal movement between the retracted position (shown in full) and the extended position (shown in phantom) wherein the arch 18's distal end D respectively occupies a position adjacent and removed from the operator station 14.

One or more tensile members such as cable 20 is wrapped around a winch 21 which may be selectively driven to unwind or retract the cable 20. The arch 18 is pivoted at its proximal end P about a transverse pivot axis 22 extending through the support ears 16 and the arch 18 by a pair of arch cylinders 24 (only one of which is shown) which are pivotally mounted to the vehicle's main frame 15 and to the arch 18.

The arch structure 18 includes a pair of fenders 26, a fairlead 28, and a log bunk 30. The log bunk 30 has a first side member 32 and a second side member 34 (both of which are longitudinally arranged), a plurality (5 are illustrated) of longitudinally disposed, laterally separated bunk webs 36 arranged between the side members 32 and 34, a plurality (2 are illustrated) of laterally disposed, longitudinally separated support beams 38 joined to the side members 32 and 34 for preferably intersecting with and bolstering the bunk webs 36, and a bumper 40 which is arranged adjacent the proximal (nearer the pivot axis 22) ends P of the bunk webs 36. The bunk webs 36 preferably include a bearing member 36a and a stiffener member 36b which cooperate to form a T-section as best illustrated in FIGS. 2 and 4.

The bumper 40 has an axis 42 which is preferably coincidental with the pivot axis 22. Each of the bunk webs 36 has a bearing surface 36' which is preferably on the bearing member 36a and which is engageable with logs. The bumper 40 includes a smooth, continuous surface 40' with which the logs are engageable. The bunk webs 36 are preferably joined to the bumper 40 by welding as illustrated in FIG. 4, but need not be for purposes of the present invention. Moreover, the bumper 40 preferably constitutes a member which pivots with the log bunk 30, but it is to be likewise understood that the bumper 40 could constitute a roller member which is rotatably journaled about its axis 42 and is supported by the vehicle's main frame 15.

The bearing surfaces 36' of the bunk webs 36 preferably intersect the bumper's log engagement surface 40' in a tangential manner as best seen in FIG. 4. While the bearing surfaces 36' are illustrated as actually intersecting the surface 40, it is to be understood that if the bumper 40 constituted a roller member as hereinbefore described, a projection of the bearing surfaces 36' (rather than the actual bearing surfaces 36) would intersect the bumper 40. It is also important to note that while a tangential intersection is preferable (as illustrated in FIG. 4), a chordal intersection of a lower, hypothetical bearing surface 36" (as shown in phantom in FIG. 4) is permissible and is considered within the scope of the invention.

Each bunk web 36 has a first portion 44, a second portion 45, and a third portion 46 which are respectively arranged proximally, intermediately, and distally relative to the pivotal axis 22. The three portions of the bunk webs 36 reflect the shape of the vehicle so as to conform thereto as nearly as practicable when the arch 18 is in the retracted position. The third portion 46 of each bunk web 36 is, by example disposed at an obtuse angle of approximately 135° (as illustrated) to the second portion 45. The first portion 44 of each bunk web 36 constitutes a tapered, transition area whose projection intersects the bumper surface 40' as previously described.

The support beams 38 are joined to the side members 32 and 34 and intersect with the bunk webs 36. The laterally disposed support beams 38 occupy positions below the bunk webs bearing surfaces 36'. No portion of the support beams 38 intersect with (even in a tangential relationship) the bearing surface 36' of any bunk web 36.

Industrial Applicability

Prepatory to loading the vehicle 10, the arch structure 18 is typically extended rearwardly and a suitable length of cable 20 is unreeled from the winch 21. The cable 20 and associated choker attachment(s) are then wrapped around the end of the log bunch L adjacent the vehicle 10. Subsequently, the cable 20 is retracted by the winch 21 and the attached log bunch L is drawn toward the log skidding vehicle 10. Typically simultaneously therewith, the arch structure 18 is pivoted toward the vehicle 10 in a clockwise manner (as viewed in FIGS. 1, 3A, 3B, 4) about the pivot axis 22. The manner of coordinating the movement of the arch 18 and cable 20 during the log loading sequence is of operator choice and is dependent upon many considerations including the underlying terrain, relative configuration of the log bunch L—vehicle 10, and log bunch size.

During the pivotal extension and retraction of the arch structure 18, the operator's view through the arch 18 of the log bunch L from the operator station 14 remains substantially unchanged due primarily to the longitudinal disposition of the bunk webs 36. In other words, as the arch 18 extends beyond the vertical, the arch subtends a decreasing vertical projection height (from the operator's vantage point). The bunk webs 36 of the arch structure 18 obstruct substantially the same percentage of the operator's view through the arch 18 for any arcuate position of the arch 18. Such characteristic tends to remove operator blind spots inherently present in arch structures having laterally disposed bunk webs. Elimination of such blind spots reduces the log skidding vehicle's cycle time by improving the operator's view to the rear of the vehicle so as to enable him to quickly maneuver the vehicle to the optimum position relative to the log bunch L. Additional operational advantages of the log skidding vehicle 10 and associated arch 18 with integral log bunk 30 are best explained with reference to FIGS. 3A and 3B wherein progressive movement of the log bunch L along the log bunk 30 is described.

FIG. 3A illustrates initial engagement between a log bunch L and the arch's bumper 40. It is to be understood that initial engagement of the log bunch L with the log bunk 30 betwen the arch's proximal and distal ends P and D, respectively, may be obtained by coordinating retraction of the cable 20 and arch cylinders 24. However, for purposes of illustrating the proficiency of the present invention, initial engagement of the log bunch L and the arch 18 is illustrated in one of the most adverse conditions.

The bumper's log engagement surface 40' has a smooth, continuous contour which is conducive to log movement in the longitudinal direction of the vehicle 10. While the bumper 40 has a circular outer periphery, it is to be understood that the bumper 40 may assume any cross sectional shape having a smooth, continous outer surface portion, (such as an oval) for promoting log slippage relative thereto. Of course such smooth, continuous surface of the bumper 40 is only required in the areas where the log bunch L may engage it. As such, the smooth, log engagement surface 40' constitutes the surface portion facing generally rearwardly and upwardly as illustrated in FIG. 3A.

Figure 3B:
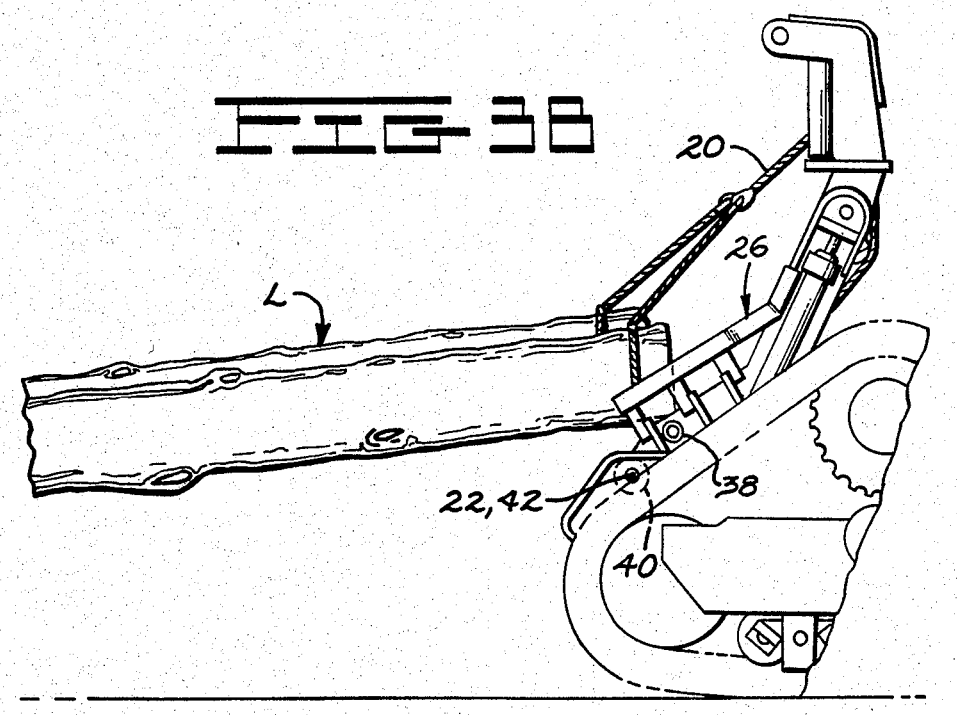

Additional retraction of the cable 20 and attached log bunch L from that illustrated in FIG. 3A causes deflection of the log bunch L by the bumper 40 and movement thereof in a longitudinal direction relative to the vehicle 10 and subsequent engagement with the bunk webs bearing surfaces 36'. Such engagement is illustrated in FIG. 3B where the log bunch L has moved past the first portion 44 and onto the second portion 45 of the bunk webs 36. Longitudinal log bunch movement on the bearing surfaces 36' along the bunk webs 36 is facilitated by the longitudinal orientation of the bunk webs 36 which tend to promote log movement therealong.

The support beams 38, being disposed beneath the bearing surfaces 36', do not interfere with longitudinal movement of the log bunch L which has often been a detriment to prior art log bunks 30 having laterally arranged bunk webs. Prior art log bunks had a further disadvantage in that log ends sometimes engaged the arch intermediate its distal and proximal ends and protruded between the lateral webs when the arch was in the extended position. When the prior art arch was subsequently retracted, the entire logs were raised typically causing the vehicle's front end to lift from the ground and reduce its load skidding capability. When the bearing surfaces 36' of the bunk webs 36 are, however, elongated in the direction of desired log movement (as they are in the present invention), log movement therealong is promoted, the vehicle's maximum skidding capacity is utilized, and little, if any, operator manipulation of the log bunch L is required subsequent to traversal of the bumper 40 by the log bunch L.

While the laterally disposed support beams 38 preferably extend through the bunk webs 36 for purposes of log bunk compactness, it is to be understood that such support beams 38 may pass under the bunk webs 36 relative to the vantage point of FIGS. 1, 2, 3A and 3B. The support beams 38, in addition to bolstering the bunk webs 36, add rigidity to the log bunk 30 and help maintain the lateral spacing between the bunk webs 36. Likewise, the bumper 40, while perferably not connected to the side members 32 and 34, is preferably joined to the bunk webs 36 so as to provide rigidity and maintain the lateral spacing of the proximal ends P of the bunk webs 36.

It is to be further noted that the bearing surface 36' of the bunk webs 36 intersect generally tangentially with the log engagment surface 40' of bumper 40 so as to provide a smooth transition therebetween. However, the only criteria that need be satisfied is that such surfaces or projections thereof do, in fact, intersect the bumper's log engagement surface 40'. If, for example, higher hypothetical bearing surfaces 36''' (as illustrated in phantom in FIG. 4 above the bumper engagement surface 40') were utilized, a log bunch L would tend to catch the proximal edge P of the bunk webs 36, hang up, and thus obstruct further log movement onto the bearing surfaces 36'''. It is clear that a projection of the proximal end P of the bearing surfaces occupying the illustrated positions 36''' does not intersect the log engagement surface 40' and thus fails to provide the desired smooth transition. However, as long as a projection of the bearing surfaces 36' intersects the bumper's log engagement surface 40' in a tangential or chordal fashion, longitudinal log movement along the arch 18 will be promoted.

While the axis 42 of the bumper 40 is preferably coincidental with the pivot axis 22 as illustrated, it is to be understood that the proximal end P of the arch 18 (and integral log bunk 30) may extend beyond the pivot axis 22. Such arch structure would provide certain advantages but, at the same time, would include certain disadvantages such as potential inteference between the proximal end P of the arch 18 and the vehicle chassis 13 during counterclockwise pivoting (extension) of the arch 18. Such arch structure is, however, also considered within the scope of the present invention. It is to be further understood that the instant arch structure 18 could be used with equal facility with a grapple instead of the illustrated fairlead 28 and cable 20.

It should now be apparent that an improved log skidding vehicle 10 having an improved arch structure 18 with integral log bunk 30 has been provided. The arch structure 18, due to the cooperative orientation of the bumper 40, bunk webs 36 and support beams 38, presents a compact, rigid, and readily manipulatable structure which maximizes productivity of the log skidding vehicle 10 by providing substantially constant operator visibility therethrough for any arch position and promoting longitudinal log movement therealong to facilitate loading and unloading thereof.

I claim:

1. A log skidding vehicle (10) comprising:
   a main frame (15) having a longitudinal axis (11); and
   an arch structure (18) pivotally connected to said main frame (15) about a pivot axis (22) transverse to said main frame's longitudinal axis (11), said arch structure (18) having a proximal end (P) and a distil end (D) relative to said pivot axis (22), said arch structure (18) including
   first (32) and second (34) longitudinally arranged, laterally separated side members,
   a plurality of longitudinally arranged, laterally separated bunk webs (36) disposed intermediate said side members (32,34), said bunk webs (36) each having a proximal end and a distil end relative to said pivot axis (22) and a bearing surface (36') which is engageable by logs and
   a bumper (40) laterally disposed adjacent said bunk webs' proximal ends (P), said bumper (40) having an axis (42) and a smooth, continuous log engagement surface (40'), a projection of each bearing surface (36') adjacent said bumper (40) intersecting said bumper's log engagement surface (40').

2. The log skidding vehicle (10) of claim 1 wherein said bunk webs (36) are joined to said bumper (40).

3. The log skidding vehicle (10) of claim 1 wherein each bunk web's bearing surface (36') has a first portion (44), a second portion (45), and a third portion (46) respectively disposed proximally, intermediately, and distally relative to said pivot axis (22), said third portion (46) being disposed at a desired angle to said second portion (45).

4. The log skidding vehicle (10) of claim 1 further comprising:
   a plurality of laterally disposed, longitudinally separated support beams (38) joined to said side members (32, 34) and being engaged with said bunk webs (36), said support beams (38) bolstering said bunk webs (36) and being below the said bearing surface (36') of said bunk web (36).

5. The log skidding vehicle (10) of claim 1 wherein said pivot axis (22) is coincidental with said bumper axis (42).

* * * * *